(12) United States Patent
Hirabayashi et al.

(10) Patent No.: US 10,556,667 B2
(45) Date of Patent: Feb. 11, 2020

(54) AIRCRAFT WING LOAD ALLEVIATION DEVICE AND AIRCRAFT WING LOAD ALLEVIATION METHOD

(71) Applicant: SUBARU CORPORATION, Tokyo (JP)

(72) Inventors: Daisuke Hirabayashi, Tokyo (JP); Kousaburou Akiba, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/035,317

(22) Filed: Jul. 13, 2018

(65) Prior Publication Data
US 2019/0061909 A1    Feb. 28, 2019

(30) Foreign Application Priority Data

Aug. 29, 2017  (JP) .................................. 2017-163833

(51) Int. Cl.
*B64C 3/38* (2006.01)
*G01L 1/22* (2006.01)
*B64C 3/18* (2006.01)

(52) U.S. Cl.
CPC ................ *B64C 3/38* (2013.01); *B64C 3/18* (2013.01); *G01L 1/22* (2013.01)

(58) Field of Classification Search
CPC .... B64C 3/18; B64C 3/38; B64C 3/52; B64C 13/16; G01L 1/22; G01L 1/2218; G01L 5/0061

(Continued)

(56) References Cited

U.S. PATENT DOCUMENTS

| 2,182,366 A * | 12/1939 | Van Vliet ................. B64C 3/52 244/38 |
| 3,730,459 A * | 5/1973 | Zuck ......................... B64C 3/38 244/48 |

(Continued)

FOREIGN PATENT DOCUMENTS

| JP | S62-031600 A | 2/1987 |
| JP | 03-038499 A | 2/1991 |

(Continued)

OTHER PUBLICATIONS

Japanese Office Action issued in corresponding Japanese Patent Application No. 2017-163833, dated Dec. 18, 2018, with English Translation.

*Primary Examiner* — Richard R. Green
*Assistant Examiner* — Brady W Frazier
(74) *Attorney, Agent, or Firm* — McDermott Will & Emery LLP

(57) ABSTRACT

An aircraft wing load alleviation device is to be provided to an aircraft having a body, a main wing, and an elongated supporting member with an end fixed to the body and another end fixed to the main wing to support the main wing. The aircraft wing load alleviation device alleviates a load acting on the main wing, and includes a load detector, an actuator, and a controller. The load detector detects the load acting on the main wing. The actuator is provided to the supporting member and applies a load in a longitudinal direction of the supporting member. The controller controls, when the load acting on the main wing is detected, operation of the actuator to make the actuator apply the load to the supporting member in a direction opposite to a direction of a load applied on the supporting member as a result of the detected load.

6 Claims, 2 Drawing Sheets

(58) Field of Classification Search
USPC .................................................... 244/99.11
See application file for complete search history.

(56) References Cited

U.S. PATENT DOCUMENTS

| | | | | |
|---|---|---|---|---|
| 2008/0272236 | A1* | 11/2008 | Rawdon | ................... B64C 1/08 |
| | | | | 244/118.1 |
| 2015/0097076 | A1* | 4/2015 | Lakic | ....................... B64C 3/38 |
| | | | | 244/46 |
| 2015/0267397 | A1* | 9/2015 | Benthien | .................. B64C 3/38 |
| | | | | 52/645 |
| 2016/0001874 | A1* | 1/2016 | Pitt | ........................... B64C 3/52 |
| | | | | 244/174 |
| 2017/0190411 | A1* | 7/2017 | Hansen | ..................... B64C 3/48 |
| 2017/0247103 | A1* | 8/2017 | Klettke | .................... B64C 1/26 |

FOREIGN PATENT DOCUMENTS

| | | |
|---|---|---|
| JP | 10-240353 A | 9/1998 |
| WO | 2001/19671 A1 | 3/2001 |

\* cited by examiner

AIRCRAFT WING LOAD ALLEVIATION DEVICE AND AIRCRAFT WING LOAD ALLEVIATION METHOD

CROSS-REFERENCE TO RELATED APPLICATIONS

The present application claims priority from Japanese Patent Application No. 2017-163833 filed on Aug. 29, 2017, the entire contents of which are hereby incorporated by reference.

BACKGROUND

The technology relates to a technique for alleviating a load acting on a main wing of an aircraft.

In some cases, an aircraft may be disturbed by a load acting on a main wing, which is generated due to a gust of wind or other factors. For example, Japanese Unexamined Patent Application Publication No. S62-031600 discloses a technique for coping with this issue.

SUMMARY

An aspect of the technology provides an aircraft wing load alleviation device to be provided to an aircraft having a body, a main wing, and an elongated supporting member with a first end fixed to the body and a second end fixed to the main wing to support the main wing. The aircraft wing load alleviation device is configured to alleviate a load acting on the main wing. The aircraft wing load alleviation device includes a load detector, an actuator, and a controller. The load detector is configured to detect the load acting on the main wing. The actuator is provided to the supporting member and configured to apply a load in a longitudinal direction of the supporting member. The controller is configured to control, when the load acting on the main wing is detected by the load detector, operation of the actuator to make the actuator apply the load to the supporting member in a direction opposite to a direction of a load that is applied on the supporting member as a result of the detected load.

An aspect of the technology provides an aircraft wing load alleviation method for alleviating a load acting on a main wing of an aircraft by using a wing load alleviation device. The aircraft has a body, the main wing, and an elongated supporting member with an end fixed to the body and another end fixed to the main wing to support the main wing. The wing load alleviation device includes a load detector configured to detect the load acting on the main wing, and an actuator provided to the supporting member and configured to apply a load in a longitudinal direction of the supporting member. The method includes causing, when the load acting on the main wing is detected by the load detector, the wing load alleviation device to operate the actuator to make the actuator apply the load to the supporting member in a direction opposite to a direction of a load that is applied on the supporting member as a result of the detected load.

DETAILED DESCRIPTION

In the following, a description is given of one implementation of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale.

In a case of a main wing, in particular, a high aspect ratio main wing, an existing cantilever wing structure may not withstand a disturbance load. In view of this, a main wing may be constructed to be upwardly supported by a truss member. However, such a wing structure has a low structural efficiency compared with the cantilever structure and can cause an increase in weight of the wing. This increase in weight may make worse the issue relating to the disturbance load acting on the main wing.

It is desirable to provide a wing load alleviation device and a wing load alleviation method for favorably alleviating a disturbance load acting on a main wing of an aircraft that has a wing structure in which a supporting member supports the main wing.

Configuration of Wing Load Alleviation Device

First, a configuration of an aircraft wing load alleviation device 10 according to an implementation of the technology will be described. Hereinafter, the aircraft wing load alleviation device may be simply called a "wing load alleviation device".

Figure 1:
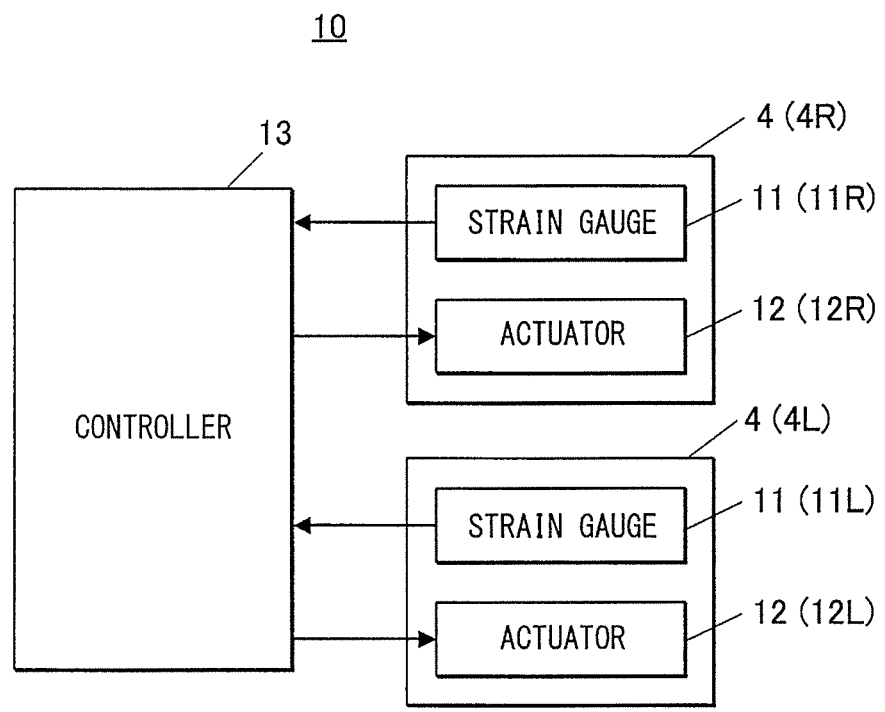
FIG. 1 is a block diagram illustrating a configuration of a wing load alleviation device according to an implementation of the technology.
Figure 2:
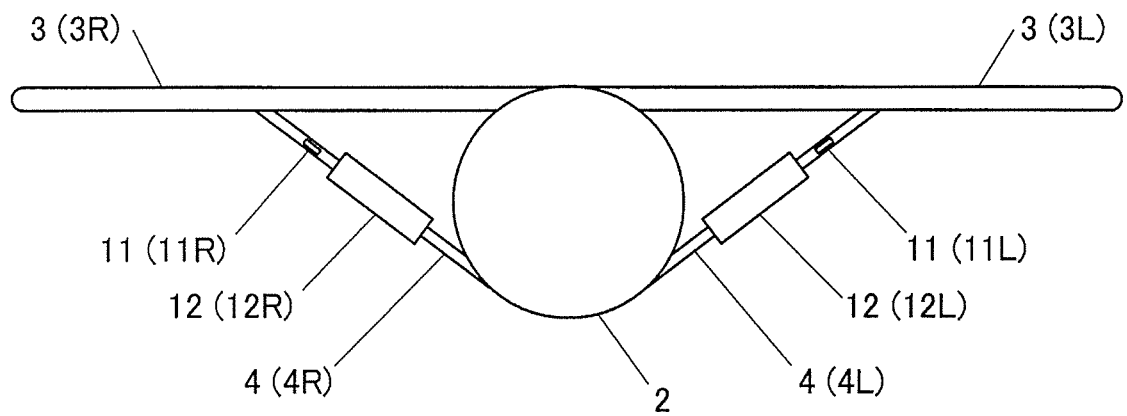
FIG. 2 is a front view illustrating an outline of an aircraft according to the implementation of the technology.
Figure 3:
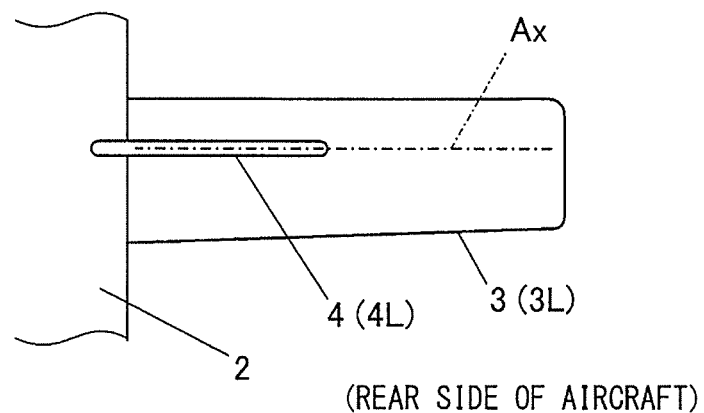
FIG. 3 is a bottom view of a main wing of the aircraft according to the implementation of the technology.

FIG. 1 is a block diagram illustrating a configuration of the wing load alleviation device 10. FIG. 2 is a front view illustrating an outline of an aircraft 1 equipped with the wing load alleviation device 10. FIG. 3 is a bottom view of a main wing 3 of the aircraft 1.

As illustrated in FIGS. 1 and 2, the wing load alleviation device 10 may be mounted on the aircraft 1 to alleviate a load acting on the main wing 3 of the aircraft 1.

The aircraft 1 according to the implementation of the technology may be a high-wing aircraft having main wings 3, i.e., a right main wing 3R and a left main wing 3L, fixed in proximity to an upper end of a body 2. Each of the main wings 3 may have an elongated shape with a relatively high aspect ratio and may be supported by a truss member 4.

The truss member 4 may have a long rod shape or a long plate shape. The truss member 4 may have a base end that is fixed at a lower part of the body 2 and may have a leading end that is fixed at approximate middle in a wing longitudinal direction of a lower surface of the main wing 3 in the condition in which the truss member 4 is laid approximately in the wing longitudinal direction in a plane view. For example, the base end of the truss member 4 may be fixed on a frame of the body 2, which is not illustrated in the drawings. On the other hand, the leading end of the truss member 4 may be fixed on an elastic axis Ax of the main wing 3 in the wing width direction, as illustrated in FIG. 3. The wing width direction is a front-rear direction of the aircraft 1.

In the following descriptions, a truss member 4 provided on right side of the aircraft 1 corresponding to the right main wing 3R may be represented by adding a symbol "R", i.e., may be denoted by a symbol "4R", whereas a truss member 4 provided on left side of the aircraft 1 corresponding to the left main wing 3L may be represented by adding a symbol "L" i.e., may be denoted by a symbol "4L". These may also be applied to the cases of a strain gauge 11 and an actuator 12, which are described later.

For example, the wing load alleviation device 10 may include the strain gauge 11, the actuator 12, and a controller 13, as illustrated in FIGS. 1 and 2.

Among these constitutional components, the strain gauge 11 may be attached on the leading end side of each of the truss members 4 in the implementation of the technology. The strain gauge 11 may be able to measure a displacement amount along a longitudinal direction of the truss member 4 by using a bridge circuit and other units, which are not illustrated in the drawings. This measurement enables indirect detection of a load acting on the main wing 3.

The strain gauge 11 may be changed to another load detector that can detect a load acting on the main wing 3. For example, instead of providing the strain gauge 11 to the main wing 3, a deflection of the main wing 3 may be measured, or a load acting on the main wing 3 may be estimated from a measurement value measured by a gravimeter mounted on the aircraft 1.

The actuator 12 may be a linear motion type and may be provided to each of the truss members 4 to move in the longitudinal direction of the respective truss member 4. The actuator 12 may expand and contract the truss member 4 in the longitudinal direction of the truss member 4 to generate a load.

The actuator 12 may not be particularly limited to a specific type unit or a specific kind unit and may be any unit that can be attached to the truss member 4 to provide a desired load.

The controller 13 may integrally control each constitutional components of the wing load alleviation device 10. For example, the controller 13 may control the operation of the actuator 12 corresponding to the strain gauge 11 on the basis of the displacement amount of the truss member 4 output from the strain gauge 11.

Operation of Wing Load Alleviation Device

Next, operation of the wing load alleviation device 10 for alleviating a load acting on the main wing 3 is described.

Figure 4:
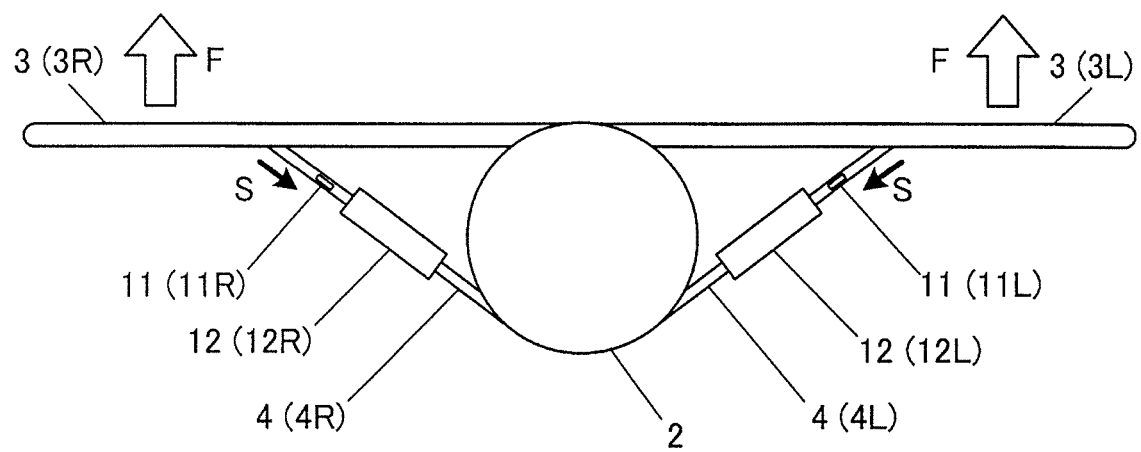
FIG. 4 is a diagram for explaining operation of the wing load alleviation device according to the implementation of the technology.

FIG. 4 is a diagram for explaining the operation of the wing load alleviation device 10.

As illustrated in FIG. 4, for example, in a case where an upward load F acts on the main wing 3 due to a gust of wind or other factor in the aircraft 1 that is flying, the truss member 4 may receive a tensile load in the longitudinal direction.

In response to this, the controller 13 may detect a displacement amount of the truss member 4 generated by the tensile load, by using the strain gauge 11. Further, the controller 13 may control the operation of the actuator 12 to generate a load S acting on the truss member 4. The load S may be a load in a direction opposite to the direction of the tensile load generated in the truss member 4, and having magnitude in accordance with the tensile load. Thus, the upward load F acting on the main wing 3 is alleviated.

Even in the case where the truss member 4 is expanded or contracted by operating the actuator 12, since the leading end of the truss member 4 is fixed on the elastic axis Ax of the main wing 3, the main wing 3 does not twist, and therefore, the elevation angle of the main wing 3 does not change. Also, since the base end of the truss member 4 is fixed on the firm frame of the body 2, the body 2 does not deform even in the case where the truss member 4 is expanded or contracted by operating the actuator 12.

At this time, in one example, the controller 13 may make the actuators 12R and 12L on the right and left sides of the aircraft 1 operate similarly not to apply an uneven load to the body 2. However, in a case where wing loads are generated that unbalance the wings on the right and left sides of the body 2, the actuators 12R and 12L may be individually operated to offset the unbalance.

Example Effects

As described above, in the implementation of the technology, in the case of detecting a load acting on the main wing 3, the actuator 12 provided to the truss member 4 applies a load to the truss member 4 in the direction opposite to the direction of a load generated in the truss member 4 by the detected load.

Thus, in the aircraft 1 having a wing structure in which the main wing 3 is supported by the truss member 4, the load acting on the main wing 3 is favorably alleviated. This favorably compensates for the increase in weight due to the truss member 4.

Since the leading end of the truss member 4 is fixed on the elastic axis Ax of the main wing 3, the main wing 3 does not twist, and therefore, the elevation angle of the main wing 3 does not change, even in the case where the truss member 4 is expanded or contracted by operating the actuator 12.

Also, since the base end of the truss member 4 is fixed on the firm frame of the body 2, the body 2 does not deform even in the case where the truss member 4 is expanded or contracted by operating the actuator 12.

According to one implementation of the technology, in a case of detecting a load acting on a main wing that is supported by a supporting member having an actuator, the actuator applies a load to the supporting member in a direction opposite to the direction of a load that is applied on the supporting member as a result of the detected load.

Thus, in an aircraft with the main wing supported by the supporting member, the load acting on the main wing is favorably alleviated.

Modification Examples

It is to be noted that the technology is not limitedly applicable to the foregoing implementations. It should be appreciated that modifications and alterations may be made by persons skilled in the art without departing from the scope as defined by the appended claims or the equivalents thereof.

The above implementation of the technology is described on the assumption that an upward load acts on the main wing 3. However, of course, effects similar to those in the above implementation of the technology are obtained in a case where a downward load acts on the main wing 3. Furthermore, an effect such as suppression of fluttering of the main wing 3 may be expected.

The structure of the main wing 3 is not particularly limited. However, the wing load alleviation effect is higher in a case of using a simple cantilevered main wing that generates a bending moment due to its root directly fixed to the body, rather than in a case of using a pin-supported main wing constructed to reduce a bending moment at its root, such as of a Cessna 172 (registered trademark).

The controller 13 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 13 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 13 illustrated in FIG. 1.

The invention claimed is:

1. An aircraft wing load alleviation device to be provided to an aircraft including a body, a main wing extending from the body, and an elongated supporting member with a first end fixed to the body and a second end fixed to the main wing to support the main wing, the aircraft wing load alleviation device being configured to alleviate a load acting on the main wing, the aircraft wing load alleviation device comprising:
    a load detector configured to detect the load acting on the main wing;
    an actuator provided to the elongated supporting member and configured to apply a load in a longitudinal direction of the elongated supporting member; and
    a controller configured to control, when the load acting on the main wing is detected by the load detector, operation of the actuator to make the actuator apply the load to the elongated supporting member in a direction opposite to a direction of a load that is applied on the elongated supporting member as a result of the detected load,
    wherein the second end of the elongated supporting member is fixed on an elastic axis of the main wing.

2. The aircraft wing load alleviation device according to claim 1,
    wherein the first end of the elongated supporting member is fixed directly to the body.

3. The aircraft wing load alleviation device according to claim 1,
    wherein the load detector comprises a strain gauge attached on the elongated supporting member and configured to detect a displacement in the longitudinal direction of the elongated supporting member.

4. The aircraft wing load alleviation device according to claim 1, wherein the main wing has a root that is directly fixed to the body.

5. An aircraft wing load alleviation method for alleviating a load acting on a main wing of an aircraft by using a wing load alleviation device, the aircraft including a body, the main wing extending from the body, and an elongated supporting member with a first end fixed to the body and a second end fixed to the main wing to support the main wing, the wing load alleviation device including a load detector configured to detect the load acting on the main wing, and an actuator provided to the elongated supporting member and configured to apply a load in a longitudinal direction of the elongated supporting member, the method comprising:
    causing, when the load acting on the main wing is detected by the load detector, the wing load alleviation device to operate the actuator to make the actuator apply the load to the elongated supporting member in a direction opposite to a direction of a load that is applied on the elongated supporting member as a result of the detected load,
    wherein the second end of the elongated supporting member is fixed on an elastic axis of the main wing.

6. An aircraft comprising:
    a body;
    a main wing;
    an elongated supporting member including a first end fixed to the body and a second end fixed to the main wing to support the main wing; and
    an aircraft wing load alleviation device configured to alleviate a load acting on the main wing,
    wherein the aircraft wing load alleviation device comprises:
        a load detector configured to detect the load acting on the main wing;
        an actuator provided to the elongated supporting member and configured to apply a load in a longitudinal direction of the elongated supporting member; and
        a controller configured to control, when the load acting on the main wing is detected by the load detector, operation of the actuator to make the actuator apply the load to the elongated supporting member in a direction opposite to a direction of a load that is applied on the elongated supporting member as a result of the detected load, and
    wherein the second end of the elongated supporting member is fixed on an elastic axis of the main wing.

* * * * *